US012714082B2

(12) United States Patent
Verdier

(10) Patent No.: US 12,714,082 B2
(45) Date of Patent: Aug. 25, 2026

(54) FISHING DEVICE

(71) Applicant: Patrick Verdier, Cumberland, RI (US)

(72) Inventor: Patrick Verdier, Cumberland, RI (US)

( * ) Notice: Subject to any disclaimer, the term of this patent is extended or adjusted under 35 U.S.C. 154(b) by 0 days.

(21) Appl. No.: 18/943,083

(22) Filed: Nov. 11, 2024

(65) Prior Publication Data

US 2025/0160310 A1 May 22, 2025

Related U.S. Application Data

(60) Provisional application No. 63/600,415, filed on Nov. 17, 2023.

(51) Int. Cl.
*A01K 85/00* (2006.01)
*A01K 91/06* (2006.01)

(52) U.S. Cl.
CPC .................................. *A01K 91/065* (2013.01)

(58) Field of Classification Search
CPC ...... A01K 91/06; A01K 91/065; A01K 99/00; A01K 83/066; A01K 85/02; A01K 85/21; A01K 85/23
USPC ............. 43/41, 41.2, 42.1, 42.4, 42.41, 43.2
See application file for complete search history.

(56) References Cited

U.S. PATENT DOCUMENTS 2,615,276 A 10/1952 Kissich
2,711,609 A * 6/1955 Bailey .................... A01K 85/02
3,040,465 A 6/1962 Gierat
3,378,946 A 4/1968 Jay
3,570,167 A 3/1971 Smith
3,947,989 A 4/1976 Bart
3,953,934 A * 5/1976 Visser .................... A01K 85/00 43/42.06
3,973,349 A * 8/1976 England ................. A01K 85/00 43/42.03
4,461,115 A 7/1984 Carrillo
4,630,389 A 12/1986 Higgins
4,703,580 A 11/1987 Kammeraad
5,031,350 A * 7/1991 Ravideau ............... A01K 83/00 43/43.4
5,185,951 A 2/1993 Hemmerle
5,331,762 A 7/1994 Banks
5,960,579 A * 10/1999 Hampton ............... A01K 93/00 43/41.2
6,658,784 B1 12/2003 Mastropaolo
6,658,785 B1 12/2003 Faulkner et al.
7,322,226 B1 1/2008 Rathgeb
7,444,778 B2 11/2008 Snowberger
8,925,242 B1 1/2015 Thomson (Continued)

*Primary Examiner* — Joshua J Michener
*Assistant Examiner* — Henry Hooper Mudd
(74) *Attorney, Agent, or Firm* — Lando & Anastasi, LLP

(57) ABSTRACT

Examples of the disclosure include a fishing device comprising an agitation device configured to move relative to a medium, the agitation device including a tapered anterior section entrained to produce laminar flow in the medium around the anterior section of the agitation device and including at least one anterior attachment site, and a posterior section that flares out from the tapered anterior section and includes at least one posterior attachment site, the at least one posterior attachment site being configured to be coupled to a lure downstream of the agitation device, the posterior section being entrained to produce turbulent flow downstream of the agitation device in a region around the lure.

20 Claims, 4 Drawing Sheets

(56) References Cited

U.S. PATENT DOCUMENTS

| | | | | |
|---|---|---|---|---|
| 8,943,738 | B2 * | 2/2015 | Parcell | A01K 85/02 |
| 9,554,566 | B2 | 1/2017 | Majszak | |
| 9,565,844 | B2 | 2/2017 | Corry et al. | |
| 10,136,629 | B1 | 11/2018 | Walrath | |
| 10,244,743 | B2 | 4/2019 | Morgan | |
| 10,993,423 | B1 | 5/2021 | Weaver | |
| 11,033,014 | B2 | 6/2021 | Cherry et al. | |
| 11,751,551 | B2 | 9/2023 | Cahoon et al. | |
| 11,871,736 | B1 | 1/2024 | Tow et al. | |
| 2002/0029509 | A1 * | 3/2002 | Hugunin | A01K 85/00 43/42.06 |
| 2004/0181993 | A1 | 9/2004 | Barbary | |
| 2005/0172539 | A1 | 8/2005 | Lieb | |
| 2006/0053680 | A1 | 3/2006 | Petitjean | |
| 2007/0033857 | A1 * | 2/2007 | Myers | A01K 93/00 43/44.9 |
| 2007/0119091 | A1 | 5/2007 | Osborn et al. | |
| 2008/0282598 | A1 | 11/2008 | Spickelmire | |
| 2010/0115821 | A1 | 5/2010 | Carlson | |
| 2011/0010984 | A1 | 1/2011 | Reynolds | |
| 2012/0066954 | A1 | 3/2012 | Barker | |
| 2015/0289492 | A1 | 10/2015 | Walsh | |
| 2018/0360012 | A1 | 12/2018 | Ruboyianes et al. | |
| 2019/0313616 | A1 | 10/2019 | Aguilar et al. | |
| 2019/0343102 | A1 | 11/2019 | Choi | |
| 2021/0195883 | A1 | 7/2021 | Want et al. | |
| 2023/0012718 | A1 | 1/2023 | Van Heerden | |
| 2023/0019432 | A1 | 1/2023 | Hartley | |

* cited by examiner

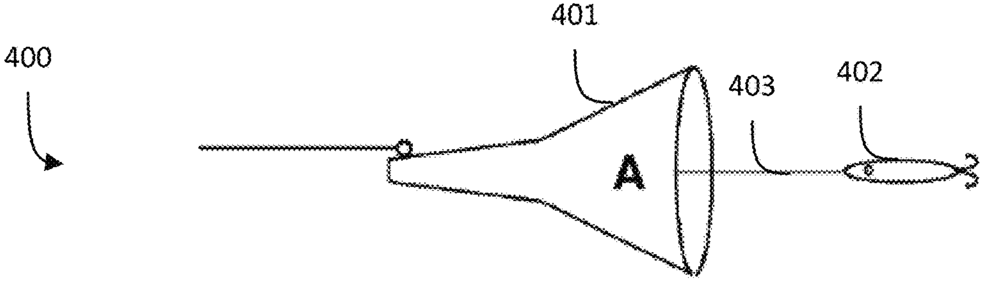
FIG. 4A
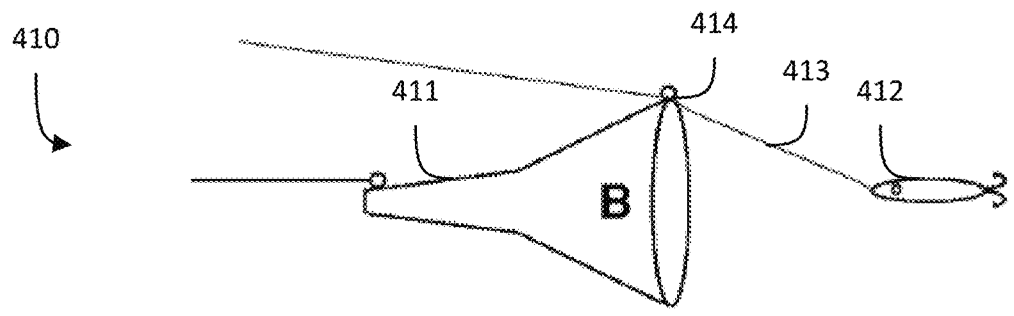
FIG. 4B
420
426
423
424
421
422
425
C
FIG. 4C
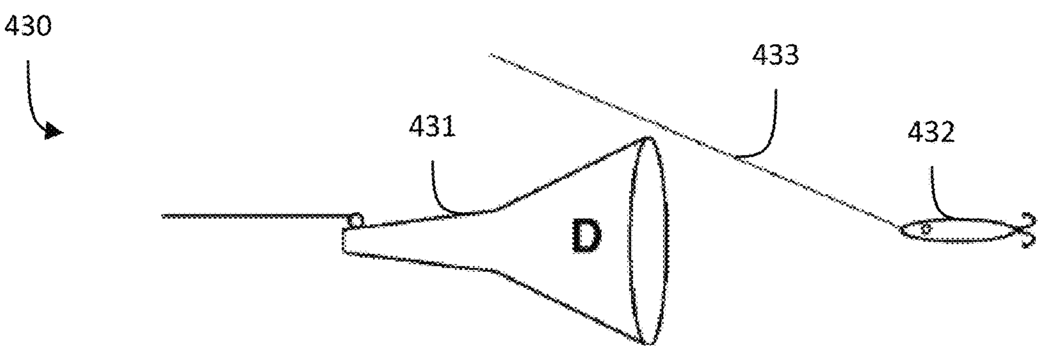
FIG. 4D

FISHING DEVICE

CROSS-REFERENCE TO RELATED APPLICATIONS

This application claims priority under 35 U.S.C. § 119(e) to U.S. Provisional Application Ser. No. 63/600,415, titled "LAMINAR FLOW DEVICE GENERATING TURBULENCE IN WHICH A FISHING LURE RESIDES," filed on Nov. 17, 2023, which is hereby incorporated by reference in its entirety.

BACKGROUND

1. Field of the Disclosure

At least one example in accordance with the present disclosure relates generally to fishing devices.

2. Discussion of Related Art

A variety of fishing devices may be used separately or in combination to attract and/or catch fish. Fishing line, which may include a high-tensile cord attached to a fishing pole, may be attached to a hook to catch fish. In some cases, a hook may be combined with a fishing lure or other apparatus to attract fish to the hook.

SUMMARY

Examples of the methods and systems discussed herein are not limited in application to the details of construction and the arrangement of components set forth in the following description or illustrated in the accompanying drawings. The methods and systems may be capable of implementation in other embodiments and of being practiced or of being carried out in various ways. Examples of specific implementations are provided herein for illustrative purposes and are not intended to be limiting. Acts, components, elements, and features discussed in connection with any one or more examples may be configured to operate and/or be implemented in a similar role in any other examples.

The phraseology and terminology used herein is for the purpose of description. References to examples, embodiments, components, elements, or acts of the systems and methods herein referred to in the singular may also embrace embodiments including a plurality. Similarly, references in plural to embodiments, components, elements, or acts may be implemented as a singularity. References in the singular or plural form may therefore not be intended to limit the presently disclosed systems or methods, their components, acts, or elements. The use herein of "including," "comprising," "having," "containing," "involving," and variations so forth, may encompass the items listed thereafter and equivalents thereof as well as additional items.

References to "or" may be construed as inclusive so that any terms described using "or" may indicate any of a single, more than one, and all of the described terms. For example, the phrase "at least one of A or B" may refer A and/or B-that is, A only, B only, or A and B together. In addition, in the event of inconsistent usages of terms between this document and documents incorporated herein by reference, the term usage in the incorporated documents is supplementary to this document. For irreconcilable differences, the term usage in this document controls.

According to at least one aspect of the present disclosure, a fishing device is provided comprising an agitation device configured to move relative to a medium, the agitation device including a tapered anterior section entrained to produce laminar flow in the medium around the anterior section of the agitation device and including at least one anterior attachment site, and a posterior section that flares out from the tapered anterior section and includes at least one posterior attachment site, the at least one posterior attachment site being configured to be coupled to a lure downstream of the agitation device, the posterior section being entrained to produce turbulent flow downstream of the agitation device in a region around the lure.

In at least one example, the tapered anterior section tapers inwards towards a direction of travel of the agitation device relative to the medium. In at least one example, the tapered anterior section includes a horizontal wedge shape. In at least one example, the horizontal wedge shape creates a diving lip that causes the tapered anterior section to tilt downwards into the medium responsive to tension being applied to the at least one anterior attachment site. In at least one example, the at least one anterior attachment site is configured to be coupled to a tow line. In at least one example, the at least one anterior attachment site is disposed on a dorsal section of the agitation device. In at least one example, a relative downward tilt of the device is proportional to the tension applied to the at least one anterior attachment site by the tow line. In at least one example, the at least one anterior attachment site is concealed from view from a perspective of a ventral section of the agitation device.

In at least one example, the at least one posterior attachment site includes a first attachment site disposed in-line with the agitation device in a middle section of the agitation device. In at least one example, the at least one posterior attachment site includes a second attachment site disposed in a dorsal section of the posterior section of the agitation device. In at least one example, the at least one posterior attachment site includes a third attachment site coupled to the second attachment site. In at least one example, the first attachment site is concealed from view from a perspective of a ventral section of the agitation device. In at least one example, the at least one posterior attachment site includes a first attachment site disposed in a dorsal section of the posterior section of the agitation device. In at least one example, the at least one posterior attachment site includes a second attachment site coupled to the first attachment site via a line. In at least one example, the fishing device includes at least one water inlet on the agitation device. In at least one example, the fishing device includes one or more stabilizing fins on the agitation device.

Examples of the disclosure include an agitation device configured to move through a medium, the agitation device comprising an anterior section configured to produce laminar flow in the medium around the anterior section of the agitation device; a posterior section configured to produce turbulent flow in the medium downstream of the agitation device; at least one attachment site configured to be coupled to at least one lure line; and at least one lure configured to be coupled to at least one lure line.

In at least one example, the anterior section includes a tapered leading edge that tapers inwards towards a direction of movement of the agitation device relative to the medium, and wherein the posterior section flares outwards from the direction of travel of the agitation device. In at least one example, the tapered leading edge includes a horizontal wedge shape. In at least one example, the horizontal wedge shape creates a diving lip that causes the tapered anterior section to tilt downwards into the medium responsive to tension being applied to the at least one attachment site.

BRIEF DESCRIPTION OF THE DRAWINGS

Various aspects of at least one embodiment are discussed below with reference to the accompanying figures, which may not be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or substantially similar component that is illustrated in various figures may be represented by a like numeral. For purposes of clarity, not every component may be labeled in every figure. In the figures:

FIG. 4A illustrates a schematic view of a fishing device according to another example;

FIG. 4B illustrates a schematic view of a fishing device according to another example;

FIG. 4C illustrates a schematic view of a fishing device according to another example; and FIG. 4D illustrates a schematic view of a fishing device according to another example.

DETAILED DESCRIPTION

In both fresh water and marine environments, surface and subsurface turbulence may act as universal attractants for many desirable species. For example, obstacles in stream beds may create riffles that induce various degrees of downstream turbulence, which fishers may exploit to increase their chances of success in catching fish. In marine environments, such as in the fishery of large-game species, lures may be deployed in the turbulent environments generated at the aft sections of a moving vessel. Additionally, some lures may be designed to generate turbulence through rotating reflective components, noise-generating elements, and bubble trails, enhancing their attractiveness to fish.

Several disadvantages exist with respect to these approaches. Some lures and fishing devices may benefit from laminar flow characteristics to reduce drag or turbulent flow characteristics to attract fish, but fail to combine both effectively. Devices designed to protect fragile baits may benefit from laminar flow to reduce drag, while those meant to deflect weeds or deploy baits at specific depths may not generate the desired turbulence. Furthermore, devices that create commotion to attract fish may lack the ability to deploy lures in the optimal turbulent flow area, limiting their effectiveness.

The present device addresses these issues by combining laminar flow characteristics at the leading edge with turbulent flow characteristics at the trailing edge, creating an optimal environment for deploying a fishing lure. An anterior section of a device may be entrained with laminar-flow characteristics, that is, an anterior section of the device may have a size, shape, and/or material construction that is designed to encourage laminar flow of the leading edge of the device through water. A posterior section of the device may be entrained with turbulent-flow characteristics, that is, a posterior section of the device may have a size, shape, and/or material construction that is designed to encourage turbulent flow downstream of a trailing edge of the device through water.

Examples of the device can be attached via multiple attachment sites and deployed in various manners, including directly in-line with conventional fishing apparatus, attached to a moving vessel, or independently deployed into a moving stream of water. The turbulent area generated by examples of the device enhance the presentation of the bait or lure to the desired species, while the laminar flow characteristics reduce drag and create a non-threatening appearance. Examples of the device's design features work in concert to control the device's aspect, stability, motion, and the quality of the generated turbulence, providing a versatile and effective fishing tool.

Figure 1:
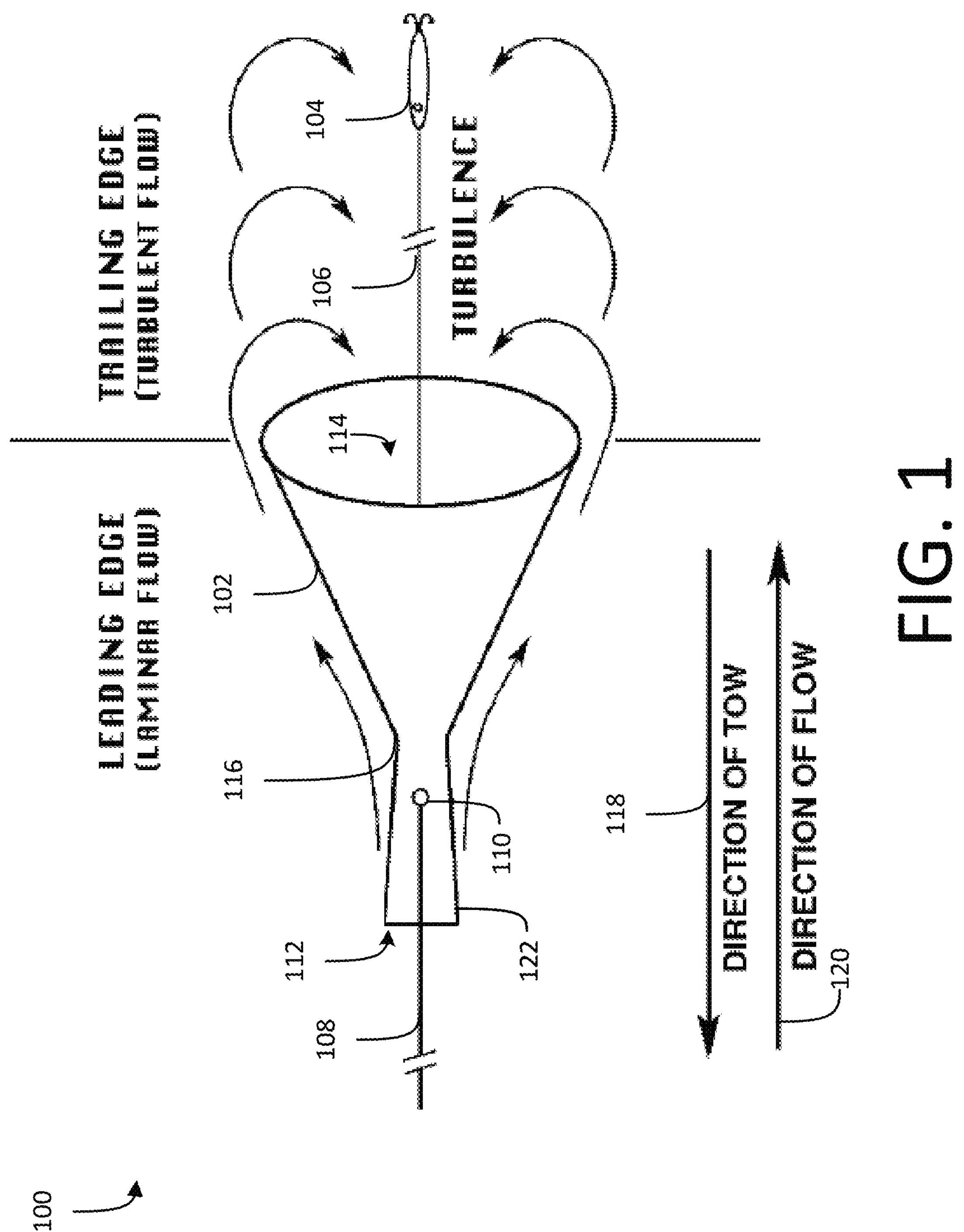
FIG. 1 illustrates a top-down schematic view of a fishing device according to a first example.

FIG. 1 illustrates a top-down schematic diagram of a fishing device 100 according to an example. The fishing device 100 includes an agitation device 102, which serves as the primary component responsible for generating the desired flow characteristics in a medium. Examples of the disclose may be implemented in any of various media, such as freshwater, salt water, oil, or some other medium; for purposes of simplicity, examples will be described in which fishing devices are implemented in water. In some examples, the agitation device 102, and other agitation devices discussed herein, may include buoyant and/or non-buoyant materials. The agitation device 102 is coupled to a lure 104 via a lure line 106, and is coupled to another fishing apparatus, such as a fishing pole or moving vessel, via a tow line 108. The tow line 108 is coupled to the agitation device 102 via an anterior attachment site 110.

The agitation device 102 includes a leading edge 112 and a trailing edge 114, and includes a tapered midsection 116 between the edges 112, 114. A section of the agitation device 102 between the leading edge 112 and the tapered midsection 116 may be referred to as an anterior section, and a section of the agitation device 102 between the tapered midsection 116 and the trialing edge 114 may be referred to as a posterior section. The agitation device 102 is designed to create laminar flow at the leading edge 112 and turbulent flow at the trailing edge 114. An anterior section of the device 102 about the leading edge 112 may be entrained with characteristics that facilitate laminar flow at the leading edge 112, such as by having a size, shape, and/or material construction that encourages laminar flow at the leading edge 112. The leading edge 112 of the agitation device 102 is shaped to minimize drag and ensure smooth water flow, which reduces resistance as the device moves through the water. For example, the leading edge 112 and anterior section may be entrained with a smooth, cone-like shape to facilitate laminar flow. The trailing edge 114 is configured to disrupt the laminar flow and generate turbulence, creating an environment that attracts fish to the lure 104.

As illustrated in FIG. 1 and discussed in greater detail below with respect to FIG. 2, the leading edge 112 may be flattened in a horizontal wedge shape 122 parallel to the surface of the water, forming a "diving lip" that causes the anterior portion 310 to progressively tilt downward (that is, away from the surface of the water) and the posterior portion 312 to progressively tilt upwards (that is, towards the surface of the water, potentially breaking the surface of the water). A moment exerted on the device 102 that causes the tilting action may be dictated at least in part by the rate of water flow relative to the device 102. The rate of water flow relative to the device 102 may affect a force on the horizontal wedge shape 122 (and thus a moment about the device 102) and may increase an amount of tension applied to the attachment site 110 by the tow line 108. The relative rate of water flow and the tension on the attachment site 110 may be related to one another. For example, if the device 102 is in stagnant water and a user pulls the device 102 by applying tension to the tow line 108, the device 102 may move relative to the water at a rate directly dictated by the tension on the attachment site 110 by the tow line 108. In another example, if the device 102 is stationary in space but is in flowing water that moves past the device 102 (that is, the device 102 is stationary relative to the ground but the water is moving relative to the ground), the water may exert a force on the device 102 that produces a tension force from the tow line 108 on the attachment site 110. The diving lip 122 may be adjustable, removable, or replaceable according to the desired performance of the device 102. For example, a size and/or shape of the diving lip 122 may be adjusted to affect the characteristics of the device 102.

The lure 104 is positioned within the turbulent flow area generated by the trailing edge 114 of the agitation device 102. This positioning enhances the lure's attractiveness to fish by taking advantage of the optical distortions, bubbles, and other commotion created by the turbulent flow. The lure line 106 ensures that the lure 104 remains securely attached to the agitation device 102 at an attachment site within the agitation device 102 (not illustrated) while allowing for some degree of movement to mimic the natural motion of prey.

The tow line 108 is secured to the agitation device 102 at the attachment site 110. The attachment site 110 is strategically located to maintain the optimal orientation and stability of the agitation device 102 as the agitation device 102 moves through the water. This ensures that the leading edge 112 consistently generates laminar flow while the trailing edge 114 produces the desired turbulence.

The anterior section of the agitation device 102 is designed to initiate laminar flow characteristics. This section may be tapered or shaped in a manner that reduces drag and allows for smooth water flow over the surface of the device. The anterior section plays a role in ensuring that the device moves efficiently through the water, minimizing resistance and maintaining stability.

The posterior section of the agitation device 102 is responsible for generating turbulent flow. This section may include design features such as indentations or flaring edges to disrupt the laminar flow and create the desired turbulence. The turbulent flow generated by the posterior section may enhance the presentation of the lure 104, making the lure 104 more attractive to fish. The tapered section 116 of the agitation device 102 serves as a transition zone between the laminar-flow-generating anterior section and the turbulent-flow-generating posterior section. The tapered section 116 ensures a smooth and gradual change in flow characteristics, optimizing the overall performance of the fishing device 100. The tapered section 116 may be designed with specific angles or curves to control the flow of water and enhance the stability and effectiveness of the device.

The direction of tow 118 indicates the relative movement of the fishing device 100 through the water, typically driven by a fishing pole or a moving vessel. The direction of flow 120 represents the relative movement of water past the device, which is opposite to the direction of tow 118. As discussed above, in some examples the device 102 may be stationary relative to the ground and/or the water may be stationary relative to the ground.

Figure 2:
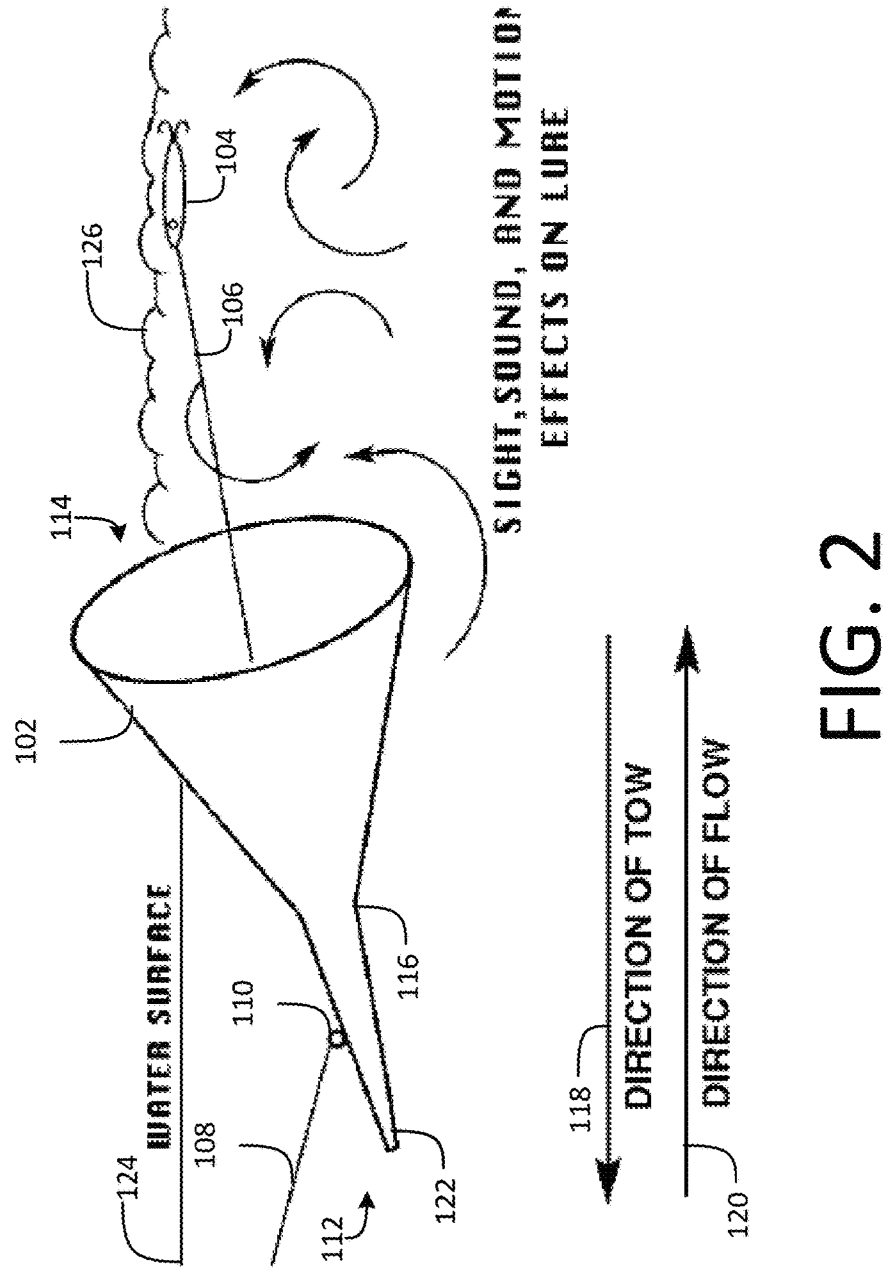
FIG. 2 illustrates a side schematic view of the fishing device of FIG. 1.

FIG. 2 illustrates a side-view schematic diagram of the fishing device 100. At least because the attachment site 110 is located on one external surface of the device 102 (for example, a top side of the device 102), the trailing edge 114 of the device 102 may be pulled upwards towards a surface of the water. Moreover, because of the wedge shape of the diving lip 122, the force of the water contacting the diving lip 122 exerts a moment on the device 102 that causes the trailing edge 114 of the device 102 to be pulled upwards towards the surface of the water.

The device 102 may at least partially break the surface of the water. Contact between the posterior section of the device 102 and the surface of the water may further enhance the turbulent flow downstream of the device 102. Whereas an upstream surface of the water 124 (that is, the surface of the water upstream of the device 102) may be relatively calm, a downstream surface of the water 126 (that is, the surface of the water downstream of the device 102 after the device 102 has interacted with the water surface) may be agitated and turbulent. Accordingly, at least the position of the attachment site 110 and the wedge shape of the diving lip 122 may facilitate the generation of agitated, turbulent flow downstream of the device 102.

Figure 3:
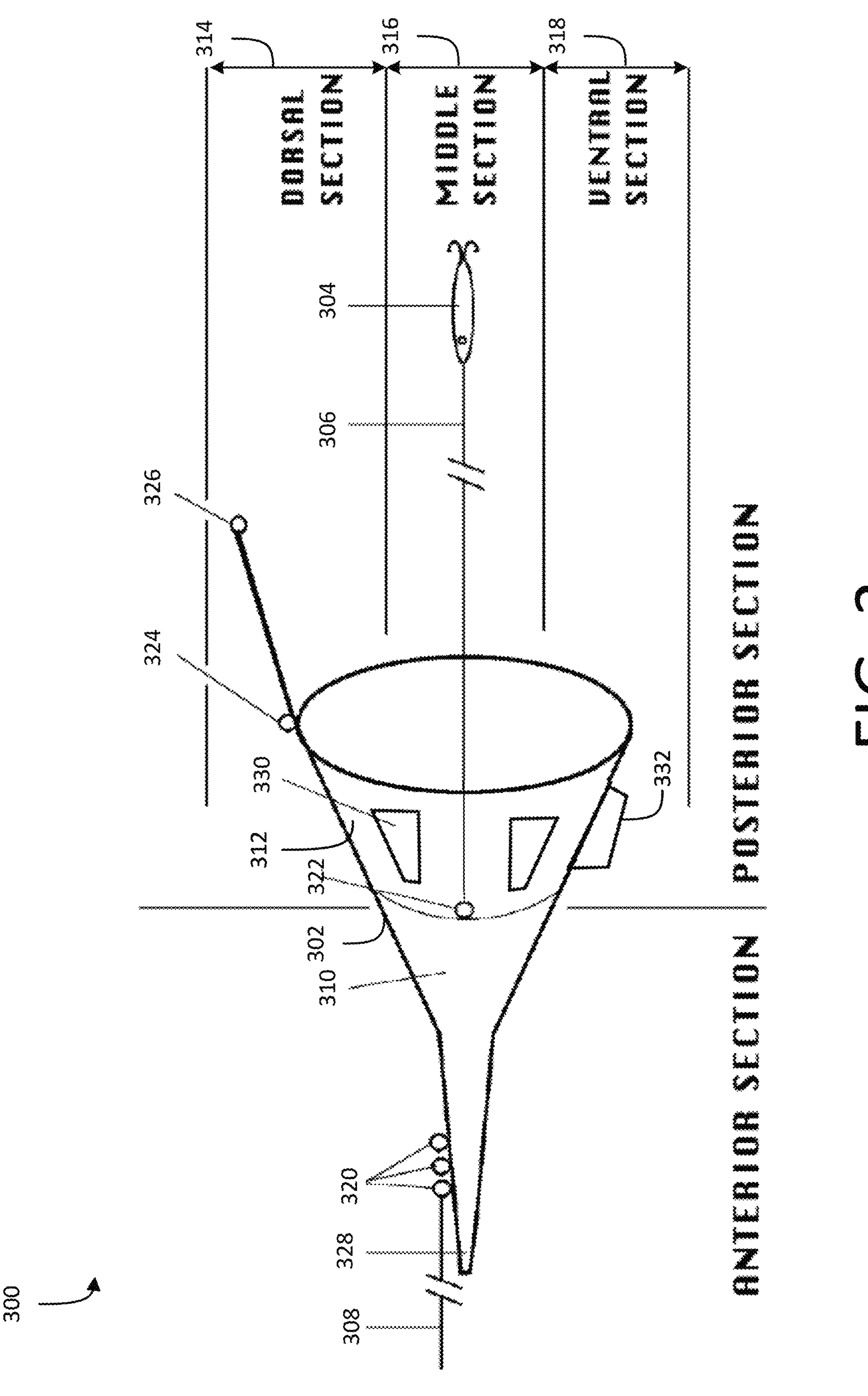
FIG. 3 illustrates a schematic view of a fishing device according to another example.

FIG. 3 illustrates a schematic diagram of a fishing device 300 according to another example. In some examples, the fishing device 300 may be substantially similar to the fishing device 100, albeit with additional features illustrated. In some examples, the fishing device 100 may represent a simpler version of the fishing device 300, and is introduced before the fishing device 300 for simplicity of explanation. Accordingly, the discussion of the features of the device 100 may be applicable to the features of the device 300, but may not be repeated for purposes of brevity.

The fishing device 300 includes an agitation device 302, which is designed to create laminar flow at the leading edge and turbulent flow at the trailing edge. The agitation device 302 serves as the primary component responsible for generating the desired flow characteristics in water. The agitation device 302 includes an anterior section 310, which is the "front" of the agitation device 302 as the device 302 travels through water, and a posterior section 312, which is the "back" of the agitation device 302 as the device 302 travels through water. The agitation device 302 further includes a dorsal section 314, which is closest to a surface of the body of water that the agitation device 302 is deployed in, a ventral section 318, which is farthest from the surface of the body of water, and a middle section 316 between the dorsal section 314 and the ventral section 318.

The agitation device 302 is coupled to a lure 304 via a lure line 306, and is coupled to another fishing apparatus, such as a fishing pole or moving vessel, via a tow line 308. The tow line 308 is secured to the anterior section 310 of the agitation device 302. In particular, the agitation device 302 may include any one or more of a plurality of anterior attachment sites 320 located on the anterior section 310 of the agitation device 302 (and, in some examples, also on the dorsal section 314 of the agitation device 302). The location of the attachment sites 320 on the dorsal section 314 may be selected such that any attachment hardware is effectively concealed from the perspective of the target species underneath, thus reducing any threatening aspect of the device 302. Each of the attachment sites 320 may be positioned at various sites along the anterior section 310. Selecting which of the attachment sites 320 to couple to the tow line 308 (that is, whether farther from or closer to the leading edge of the device 302) may affect a tilt of the device 302 relative to the rate of flow of water across the device 302. Accordingly, providing multiple attachment sites 320 may increase versatility of the device 302 according to user preference. Although three attachment sites are depicted for purposes of explanation, any number of one or more attachment sites may be provided.

The anterior section 310 of the agitation device 302 is designed to initiate laminar flow characteristics. The anterior section 310 may be tapered or shaped in a manner that reduces drag and allows for smooth water flow over the surface of the device. The anterior section 310 ensures that the device moves efficiently through the water, minimizing resistance and maintaining stability. The anterior section 310 includes a tapered anterior edge 328, or tip, which enhances the initial laminar flow characteristics about the device while mitigating turbulence.

The posterior section 312 of the agitation device 302 is responsible for generating turbulent flow. This section may include various design features, such as indentations or flaring edges, to disrupt the laminar flow and create the desired turbulence. The posterior section 312 flares outward from the tapered anterior section 310. The turbulent flow generated by the posterior section 312 may enhance the presentation of the lure 304, making the lure 304 more attractive to fish. The posterior section 312 transitions from laminar flow characteristics to turbulent flow characteristics at and beyond the trailing edge of the device 302 itself.

The middle section 316 of the agitation device 302 serves as a transition zone between the laminar-flow-generating anterior section 310 and the turbulent-flow-generating posterior section 312. The middle section 316 ensures a smooth and gradual change in flow characteristics, optimizing the overall performance of the fishing device 300. This section may be designed with specific angles or curves to control the flow of water and enhance the stability and effectiveness of the device.

The ventral section 318 of the agitation device 302 is the lower part of the device 302, which is from the surface of the water. The ventral section 318 may be designed to reduce the surface area relative to the dorsal section 314 to mitigate lifting or hydroplaning forces proportional to the rate of flow of water across the device 302. The ventral section 318 may also include additional design considerations to enhance the stability and performance of the device 302.

In addition to the plurality of attachment sites 320, which are configured to couple the device 302 to the tow line 308, the device 302 may further include one or more posterior attachment sites which may be configured to be coupled to the lure line 306. Example posterior attachment sites may include one or more of a first posterior attachment site 322, a second posterior attachment site 324, and a third posterior attachment site 326. In some examples, the third attachment site 326 may be attached to the second attachment site 324, such as via a line. In some examples, the third attachment site 326 and the line connecting the second attachment site 324 and the third attachment site 326 may be omitted. In various examples, both the second attachment site 324 and the third attachment site 326 may be omitted.

The first attachment site 322 is located roughly at a midpoint of the device 302 separating the anterior section 310 and the posterior section 312 of the agitation device 302. The first attachment site 322 may be located within the device 302, for example, within the posterior section 312 of the device 302. In some examples, the posterior section 312 of the device 302 may create a hollow, flared-out cone, and the first attachment site 322 may be disposed at the apex of the interior of the cone shape. The first attachment site 322 allows for the lure 304 to be secured to the device 302 at a central internal location equipped with an "eye" to which a line or leader, such as the lure line 306, can be either attached directly, tied, or clipped with one of many types of attachment hardware designed for the fishing industry. The first attachment site 322 may be considered to be positioned in-line with the device 302 at least because the first attachment site 322 is located roughly at the transition between the dorsal section 314 and the central section 318. The internal location of the first attachment site 322 is such that the ventral section 318 in combination with any forward tilt of the device 302 effectively conceals the first attachment site 322 and any associated hardware from the perspective of the species being sought.

The second attachment site 324 is an auxiliary attachment site located on the posterior section 312 of the agitation device 302 and in the dorsal section 314 of the agitation device 302. This attachment site 324 may be used to secure additional lines or lures to the device 302, providing flexibility in the deployment of the lure 304 within the turbulent flow area generated by the device 302. In other words, the lure 304, or a different or additional lure, may be attached to the second attachment site 324 in addition to, or in lieu of, the first attachment site 322. The second attachment site 324 may be positioned to ensure that any attachment hardware is concealed from the perspective of the target species underneath.

In some examples, the second attachment site 324 may be equipped with a clip, clamp, or similar device configured to release when a species being sought attaches to the lure 304, generating increased tension that causes the attachment apparatus to disengage.

The third attachment site 326 is a secondary attachment site located on the posterior section 312 of the agitation device 302 and in the dorsal section 314 of the agitation device 302. This attachment site 326 provides additional options for securing lines or lures to the device, allowing for a variety of configurations to enhance the presentation of the lure 304. In other words, the lure 304, or a different or additional lure, may be attached to the third attachment site 326 in addition to, or in lieu of, the first attachment site 322 and/or the second attachment site 324. The third attachment site 326 may be positioned to ensure that any attachment hardware is concealed from the perspective of the target species underneath. In various examples, the third attachment site 326 may be configured to be coupled to an additional lure via a lure line at some distance at or above the surface of the water.

The tapered anterior edge 328 of the agitation device 302 is designed to enhance the initial laminar flow characteristics about the device 302 while mitigating turbulence. The tapered anterior edge 328 may be flattened in a horizontal wedge shape parallel to the surface of the water, forming a "diving lip" that causes the anterior portion to progressively tilt downward relative to the rate of water flow past the device 302. The diving lip may be adjustable, removable, or replaceable according to the desired performance of the device 302.

In at least one example, the agitation device 302 may include at least one optional water inlet 330 and/or at least one optional stabilizing fin 332. The water inlet 330 is incorporated into the fishing device 300 to enhance the turbulent effect generated by the agitation device 302. The water inlet 330 may include a void through the body of the device 302, channels or surface irregularities, a convex feature, and/or a concave feature. The water inlet 330 serves to deflect or divert supplemental flows of water into the area of turbulence (for example, in a region around the lure 304), thereby increasing the commotion and optical distortions in the water. The water inlet 330 may generate jets of water, incorporation of bubbles, and other optical or auditory disturbances to enhance the presentation of the deployed lure. The water inlet 330 may be positioned at various locations on the fishing device 300 to optimize the flow dynamics and improve the overall performance of the device 302. Furthermore, a size, position, number, and configuration of the water inlet(s) 330 may be modified to produce desired agitation effects. The device 302 may include multiple water inlets including the water inlet 330. In some examples, the device 302 may include one or more water inlets in the anterior section 310 in addition to, or in lieu of, water inlets in the posterior section 312.

In some examples, at least one optional stabilizing fin 332, or deflection vane, is attached to the agitation device 302 to provide additional stability and control the movement of the device 302 in the water column. The stabilizing fin 332 may be positioned at various locations on the fishing device 300 to either cause the device to track in line or at some angle to the direction of the relative flow of water. For example, the stabilizing fin 332 may be positioned in the posterior section 312 and the ventral section 318 of the agitation device 302; and/or may be positioned in the posterior section 312 and the dorsal section 314 of the agitation device 302; and/or may be positioned at other locations on the agitation device 302. The stabilizing fin 332 may be variously configured or made adjustable to enable additional tracking characteristics, and in one implementation, allowing for the rotation of the device 302 while deployed. The stabilizing fin 332 ensures that the fishing device 300 maintains the optimal orientation and stability as the device moves through the water, thereby enhancing the effectiveness of the generated turbulence and the presentation of the lure. The device 302 may include multiple stabilizing fins including the stabilizing fin 332.

Accordingly, various agitation devices may be provided with various different lure-attachment sites. FIGS. 4A-4D illustrate various examples of agitation devices with different potential attachment sites. For example, FIGS. 4A-4D may illustrate examples in which only the first attachment site 322 is attached to a lure, or in which only the second attachment site 324 is attached to a lure, or in which only the third attachment site 326 is attached to a lure, or in which none of the attachment sites 322-326 is attached to a lure. These examples are provided as non-limiting examples, and other implementations are within the scope of the disclosure.

FIG. 4A illustrates a schematic diagram of a fishing device 400 according to another example. The fishing device 400 includes an agitation device 401, which is the primary component responsible for generating the desired flow characteristics in water. The device 401 is designed to be either cast, entrained, or deployed in water such that the device 401 is subject to laminar flow characteristics at the leading edge while generating turbulent flow characteristics at or at some distance from the trailing edge. The agitation device 401 serves as the main structure to which other components are attached and interacts with the water to create the necessary flow dynamics for attracting fish. The agitation device 401 may include various design features, such as indentations or flaring edges, to enhance the turbulent flow and improve the presentation of the lure 402.

The lure 402 is positioned within the turbulent flow area generated by the trailing edge of the agitation device 401. The lure 402 is designed to attract fish by taking advantage of the optical distortions, bubbles, and other commotion created by the turbulent flow. The lure 402 may be of various designs, including spoons, poppers, spinners, flies, jigs, artificial or natural baits, baited hooks, and other devices. The lure 402 is intended to be struck directly by the fish, which then becomes attached to the lure 402 via one or more hooks or barbs.

The lure line 403 connects the lure 402 to the fishing device 400. The lure line 403 ensures that the lure 402 remains securely attached to the fishing device 400 while allowing for some degree of movement to mimic the natural motion of prey. The lure line 403 may be attached to the fishing device 400 at a central internal location equipped with an “eye” to which the line or leader can be either attached directly, tied, or clipped with one of many types of attachment hardware designed for the fishing industry. The location of the attachment site for the lure line 403 effectively conceals the attachment from the perspective of the target species underneath, reducing any threatening aspect of the device.

The fishing device 400 illustrates an in-line implementation in which the device 401 may be attached directly to the line 403. The device 401 may be cast, or let out from a vessel while in motion, or released into a current (for example, a tidal or river current), and so forth. In some examples, such as examples in which the device 401 is intended to be cast, the device 401 may include a lightweight buoyant material.

FIG. 4B illustrates a schematic diagram of a fishing device 410 according to another example. The fishing device 410 includes an agitation device 411, a lure 412, a lure line 413, and an attachment site 414. The fishing device 410 is similar to the device 400; however, whereas the lure 402 is attached in-line to the device 401, the lure 412 is attached to an independent attachment site 414 in a dorsal section of the device 411. In some examples, the independent attachment site 414 may include a clip, clamp, or other attachment apparatus that releases a line from the device 410 when a fish or other quarry strikes the lure 412. This implementation enables the lure 412 to be placed at a range of distances from the device 411 in an area of desired turbulent flow.

FIG. 4C illustrates a schematic diagram of a fishing device 420 according to another example. The fishing device 420 includes an agitation device 421, a lure 422, an attachment site 423, a line including a first line portion 424 and a second line portion 426, and a stem 425. The fishing device 410 is similar to the device 400; however, whereas the attachment site 414 is disposed directly on the device 411, the attachment site 423 of the device 420 is attached to the agitation device 421 via the stem 425. Furthermore, the lure 422 is attached to the attachment site 423 via the first line 424, and the attachment site 423 is attached to a fishing apparatus, such as a fishing pole, via the third line 426.

The device 420 of FIG. 4C may enable the lure 422 to be held at or above a surface of the water, or such that the lure 422 intermittently touches a surface of the water. This contact with the surface of the water may be more attractive to target species. In some examples, the attachment site 423 may include a releasable attachment mechanism to release when a target strikes the lure 422.

FIG. 4D illustrates a schematic diagram of a fishing device 430 according to another example. The fishing device 430 includes an agitation device 431 deployed with a lure 432 and a lure line 433. The fishing device 430 is similar to the device 400; however, whereas the lure line 403 of FIG. 4A is attached to the device 401, in FIG. 4D, the lure line 433 and the lure 432 are detached from the agitation device 431. One or more lures, such as the lure 432, may be independently deployed within the turbulent flow at any of various distances. A user utilizing the lure 432 may freely adjust the location of the lure 432 to improve chances of success.

In some examples, any of the devices discussed above may be modified to include additional or different features such as water inlets, surface irregularities, stabilizing fins, and so forth.

Examples of the disclosure therefore provide an agitation device that facilitates laminar flow through water at a leading edge of the device, and that creates turbulent flow in water downstream of the device. Turbulence may include surface or subsurface commotion creating optical distortions, irregular water surface alterations, incorporation of bubbles or splashing water jets, creation of noise, and so forth. One or more lures may be disposed in the turbulent flow downstream of the device. Lures may include any device attached to a fishing line that may attract fish or other target species, and may include hooks, barbs, or similar devices. Example lures may include spoons, poppers, spinners, flies, jigs, artificial or natural baits, baited hooks, and so forth.

In some examples, certain sections of agitation devices may be identified by terms such as anterior, posterior, dorsal, ventral, and middle. In some examples, the sections denoted in the drawings may or may not correspond precisely to an actual location of various elements. For example, in some examples, the attachment sites 320 may be in the dorsal section 314 (and the anterior section 310), whereas in other examples, the attachment sites 320 may be in the middle section 316 (and the anterior section 310).

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A fishing device comprising:

an agitation device configured to move relative to a medium, the agitation device including:

an internal surface, an external surface, a tapered anterior section having a leading edge and being entrained to produce laminar flow in the medium around the tapered anterior section of the agitation device, the tapered anterior section including at least one anterior attachment site on a dorsal section of the external surface and being configured to be coupled to a tow line, a posterior section that flares out from the tapered anterior section and includes a trailing edge and at least one posterior attachment site, the at least one posterior attachment site being configured to be coupled to a lure line different from the tow line and configured to be coupled to a lure downstream of the agitation device, and a midpoint joining the tapered anterior section and the posterior section, wherein the tapered anterior section tapers from the midpoint to the leading edge and the posterior section flares out from the midpoint to the trailing edge, the posterior section being entrained to produce turbulent flow downstream of the agitation device in a region around the lure.

2. The fishing device of claim 1, wherein the tapered anterior section tapers inwards from the midpoint towards a direction of travel of the agitation device relative to the medium.

3. The fishing device of claim 2, wherein the tapered anterior section includes a horizontal wedge shape.

4. The fishing device of claim 3, wherein the horizontal wedge shape creates a diving lip that causes the tapered anterior section to tilt downwards into the medium responsive to tension being applied to the at least one anterior attachment site.

5. The fishing device of claim 4, wherein a relative downward tilt of the fishing device is proportional to the tension applied to the at least one anterior attachment site by the tow line.

6. The fishing device of claim 5, wherein the at least one anterior attachment site is concealed from view from a perspective of a ventral section of the agitation device.

7. The fishing device of claim 1, wherein the at least one posterior attachment site includes a first attachment site disposed in-line with the agitation device in a middle section of the agitation device.

8. The fishing device of claim 7, wherein the at least one posterior attachment site includes a second attachment site disposed in a dorsal section of the posterior section of the agitation device.

9. The fishing device of claim 8, wherein the at least one posterior attachment site includes a third attachment site coupled to the second attachment site.

10. The fishing device of claim 7, wherein the first attachment site is concealed from view from a perspective of a ventral section of the agitation device.

11. The fishing device of claim 1, wherein the at least one posterior attachment site includes a first attachment site disposed in a dorsal section of the posterior section of the agitation device.

12. The fishing device of claim 11, wherein the at least one posterior attachment site includes a second attachment site coupled to the first attachment site.

13. The fishing device of claim 1, further comprising at least one water inlet on the agitation device, the at least one water inlet including a void through the posterior section extending from the internal surface to the external surface.

14. The fishing device of claim 1, further comprising one or more stabilizing fins on the agitation device.

15. An agitation device configured to move through a medium, the agitation device comprising:

an internal surface;

an external surface;

an anterior section having a leading edge and being configured to produce laminar flow in the medium around the anterior section of the agitation device, the anterior section including at least one anterior attachment site on a dorsal section of the external surface and being configured to be coupled to a tow line;

a posterior section having a trailing edge and being configured to produce turbulent flow in the medium downstream of the agitation device;

a midpoint joining the anterior section and the posterior section, wherein the anterior section tapers from the midpoint to the leading edge and the posterior section flares out from the midpoint to the trailing edge;

at least one attachment site configured to be coupled to at least one lure line; and at least one lure configured to be coupled to at least one lure line.

16. The agitation device of claim 15, wherein the anterior section includes a tapered leading edge that tapers inwards from the midpoint towards a direction of movement of the agitation device relative to the medium, and wherein the posterior section flares outwards from the midpoint from the direction of travel of the agitation device.

17. The agitation device of claim 16, wherein the tapered leading edge includes a horizontal wedge shape that creates a diving lip that causes the tapered leading edge to tilt downwards into the medium responsive to tension being applied to the at least one attachment site.

18. The fishing device of claim 3, wherein the horizontal wedge shape includes a flattened surface on the dorsal section of the external surface of the tapered anterior section.

19. The fishing device of claim 1, wherein the tapered anterior section is fully enclosed and does not include the internal surface.

20. The fishing device of claim 1, wherein from a side view of the agitation device, the agitation device continuously increases in diameter from the leading edge to the trailing edge.

* * * * *